United States Patent
Clubley et al.

(10) Patent No.: US 7,649,924 B2
(45) Date of Patent: Jan. 19, 2010

(54) FIRST-PULSE SUPPRESSION IN A REGENERATIVE AMPLIFIER

(75) Inventors: David Clubley, Glasgow (GB); Angus Sutherland Bell, Glasgow (GB)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/599,832

(22) Filed: Nov. 15, 2006

(65) Prior Publication Data

US 2008/0112041 A1    May 15, 2008

(51) Int. Cl.
*H01S 3/082* (2006.01)

(52) U.S. Cl. .......................... 372/97; 372/93; 372/106; 372/107

(58) Field of Classification Search ............... 372/93, 372/97, 92, 95, 99–108
See application file for complete search history.

(56) References Cited

U.S. PATENT DOCUMENTS

| 4,660,205 | A | * | 4/1987 | Harter et al. | 372/18 |
| 5,075,893 | A | * | 12/1991 | Epstein et al. | 372/108 |
| 5,121,402 | A | * | 6/1992 | Scheps | 372/70 |
| 5,963,363 | A | * | 10/1999 | Weston et al. | 359/345 |
| 6,038,241 | A |  | 3/2000 | von Elm et al. | 372/30 |
| 6,078,606 | A |  | 6/2000 | Naiman et al. | |
| 6,418,154 | B1 |  | 7/2002 | Kneip et al. | 372/25 |
| 6,683,893 | B2 |  | 1/2004 | Wang | 372/10 |
| 6,931,035 | B2 |  | 8/2005 | Wang | 372/10 |
| 2004/0228376 | A1 | * | 11/2004 | Dane et al. | 372/32 |

FOREIGN PATENT DOCUMENTS

| EP | 0609978 A1 | 8/1994 |
| JP | 10-190117 A | 7/1998 |
| WO | WO-00/55947 A1 | 9/2000 |

OTHER PUBLICATIONS

Boczar, B. P. et al. (Jun. 1, 1983). "New Scheme for Ultrashort-Pulsed Nd3+:YAG Laser Operation: A Branched Cavity, Internally Seeded Regenerative Amplifier," *Applied Optics* 22(11):1611-1613.

* cited by examiner

*Primary Examiner*—Minsun Harvey
*Assistant Examiner*—Xnning Niu
(74) *Attorney, Agent, or Firm*—Morrison & Foerster LLP

(57) ABSTRACT

A regenerative amplifier includes a gain-medium that is optically pumped by CW radiation. The amplifier has primary resonator for amplifying pulses. The primary resonator has an optical switch for opening and closing the primary resonator. The amplifier has a secondary resonator that includes the gain-medium but not the optical switch. When the primary resonator is closed by the optical switch, and pulses are not being amplified, CW radiation is generated in the secondary resonator and prevents the gain-medium from being saturated. When the optical switch is operated to cause the primary resonator to amplify pulses, generation of CW radiation in the secondary resonator ceases.

26 Claims, 3 Drawing Sheets

FIRST-PULSE SUPPRESSION IN A REGENERATIVE AMPLIFIER

TECHNICAL FIELD OF THE INVENTION

The present invention relates in general to regenerative amplifiers for amplifying trains of seed-pulses delivered by a laser. The invention relates in particular to clamping the gain of a regenerative amplifier such that the amplitude of the first pulse in an amplified train of pulses does not significantly exceed that of subsequent pulses in the pulse-train.

DISCUSSION OF BACKGROUND ART

A continuously optically pumped (CW optically pumped) optical amplifier (resonator) for delivering pulsed optical radiation is typically held in an operation-ready state with optical pump-light delivered continuously to a gain-medium of the optical amplifier. When the amplifier is not actually operating, i.e., not delivering pulses, the gain-medium becomes saturated as pump-energy is being delivered to the gain-medium without any pulse energy being removed from the gain-medium.

Pulsed lasers that deliver pulses having a duration on the order of nanoseconds (ns) at frequencies of up to a few tens of kilohertz, usually include an optical resonator with an intra-resonator acousto-optical switch that can cause resonator losses to be variable in response to an applied RF potential. In the operation-ready state, the optical switch is in a "closed" mode such that the switch creates such optical losses in the resonator in a manner so that generation of pulsed radiation is not possible. Pulsed operation of the resonator is caused by periodically fully opening (no losses) and closing the optical switch. Absent any preventive measure, when the optical switch is opened for the first time in a sequence of openings and closings thereof to generate a train of pulses, all of the saturated gain is available and is extracted by the first pulse. The time between the delivery of the first pulse and the second pulse and between pulses thereafter is usually too short to allow the gain-medium to saturate, and these pulses will each have energy less than the first pulse.

In most applications of laser pulses, it is desirable that all pulses in a train thereof have about the same energy or peak power. This being the case, some measure must be taken to prevent the first pulse in a pulse-train from being more powerful than subsequent pulses in the pulse-train. In pulsed resonators using acousto-optical switches, one common measure to reduce the energy of the first pulse is to establish an operation-ready mode with the switch partially open to an extent that the resonator generates low-power CW laser radiation in response to the CW optical pumping. This prevents the gain-medium from saturation, and the extent of the switch opening can be adjusted such that the available gain is "clamped" at a about level that would be reached in a pulse-repetition period. Once the switch begins periodically fully-opening and closing at the pulse-repetition frequency, the first and subsequent pulses have about the same energy.

In apparatus for delivering trains of very short pulses, for example, pulses having a duration of less about a few picoseconds (ps), it is usual to employ a seed-pulse laser to generate low-power pulses (seed-pulses) and deliver these low power pulses to a regenerative amplifier for amplification. A regenerative amplifier usually has a resonator including a CW pumped gain-medium and a polarizing beam splitter cooperative with a half-wave rotator and a very fast electro-optical polarization-rotating switch such as a Pockels cell.

In one common arrangement, a seed pulse is transmitted into the resonator through the polarizing beamsplitter and the Pockels cell is then switched to rotate the polarization of the pulse so that the pulse can no longer be transmitted by the polarizing beamsplitter, thereby trapping the pulse in the resonator. The pulse circulates in the resonator and is amplified as it extracts energy from the gain-medium. After a predetermined number of round trips of the pulse in the resonator, the Pockels cell is switched such that the polarization-plane of the pulse rotates back to the orientation that is transmitted by the polarizing beamsplitter, and is delivered through the polarizing beamsplitter, out of the resonator. The switching operation (admitting seed-pulses and delivering amplified pulses) is repeated throughout the pulse sequence.

In a regenerative amplifier, the first pulse in a sequence will also usually have a much higher power than remaining pulses of the sequence. In the regenerative amplifier arrangement, however, the Pockels cell based optical switching arrangement can not be operated in the same manner as an acousto-optical switch to cause low level CW operation for gain-clamping. There is a need for a method of gain-clamping in a regenerative amplifier.

SUMMARY OF THE INVENTION

The present invention is directed to a method for reducing the power in the first pulse of a train of pulses amplified by a regenerative amplifier. In one aspect, optical apparatus in accordance with the present invention comprises a primary resonator terminated by first and second mirrors. The primary resonator includes a gain-medium and an optical switching arrangement for opening and closing the primary resonator. The apparatus further includes a secondary resonator. The secondary resonator includes the gain-medium but does not including the optical switching arrangement.

In another aspect of the apparatus the gain-medium is optically pumped with CW radiation. The primary resonator is the resonator in which pulses are amplified. When the primary resonator is closed, and pulses are not being amplified, CW radiation is generated in the secondary resonator. This limits the optical gain available at any instant in the gain-medium. When the primary resonator is open and operated to amplify pulses, generation of CW radiation in the secondary resonator ceases. Limiting the instantaneous available gain in the gain-medium provides that the peak-power difference between the first pulse in an amplified train of pulses and the average peak power of the second and subsequent pulses in the pulse-train is less than would be the case if CW generation was not generated and the gain in the gain-medium was allowed to reach saturation before amplification of pulses was commenced.

In a preferred embodiment of the apparatus, the gain-medium is a birefringent gain-medium having a stronger gain for radiation plane-polarized in a first polarization-orientation than for radiation plane-polarized in a second polarization-orientation perpendicular to the first polarization-orientation. The primary resonator is terminated by first and second mirrors and is configured for circulating only radiation plane-polarized in the first polarization-orientation. The secondary mirror is terminated by the first mirror and a third mirror. Between the first mirror and the gain-medium the resonator-axes of the primary and secondary resonators are collinear, and in the gain-medium and between the gain-medium and the third mirror the resonator-axes of the primary and secondary resonators are at an angle to each other.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
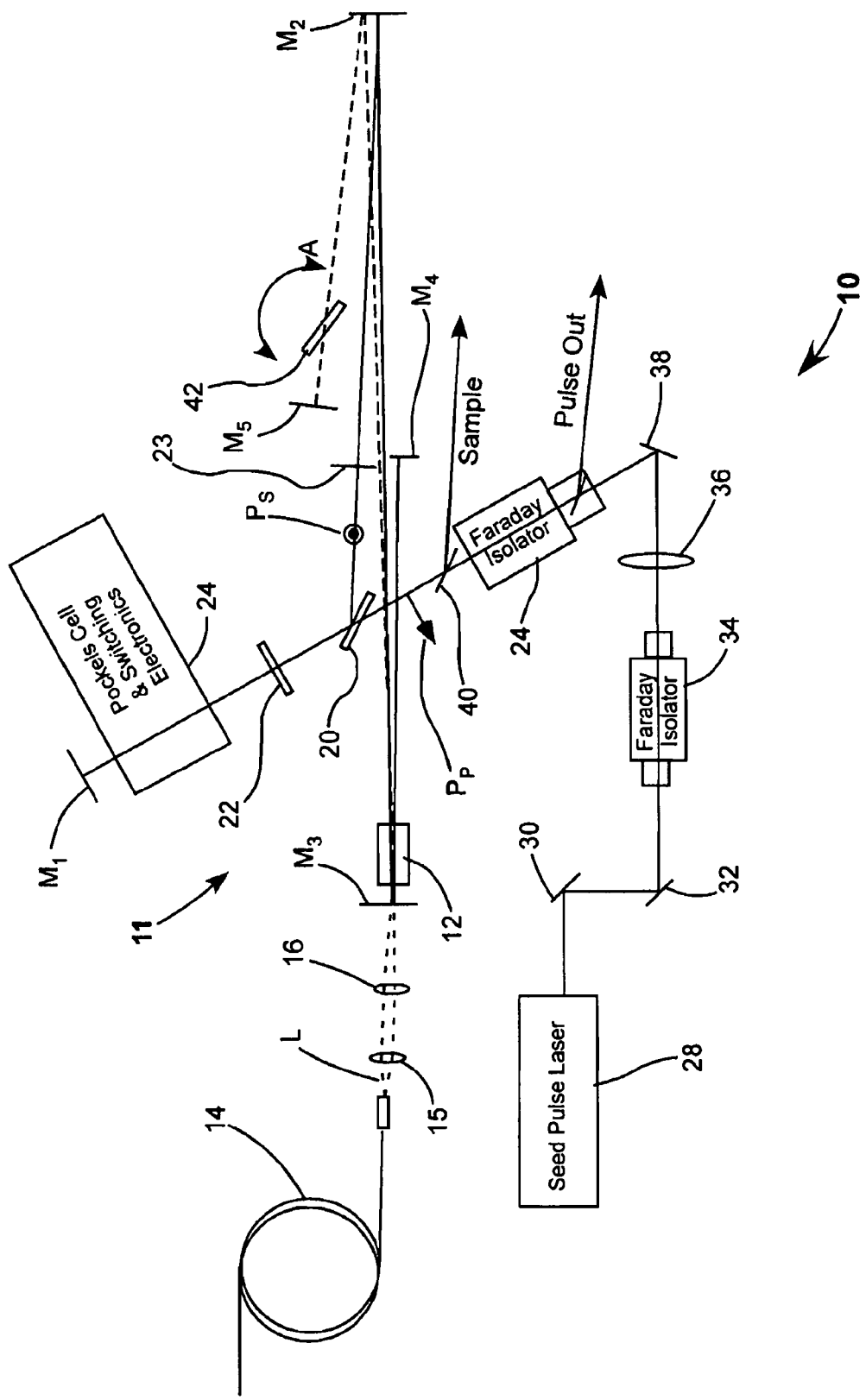
FIG. 1 schematically illustrates a preferred embodiment of laser apparatus in accordance with the present invention including a seed pulse laser delivering seed-pulses to a regenerative amplifier, the regenerative amplifier including a folded primary resonator formed between first and second mirrors and a folded secondary resonator formed between the first mirror and a third mirror for providing gain-clamping when the regenerative amplifier is not amplifying pulses.

Referring now to the drawings, wherein like components are designated by like reference numerals, FIG. 1 schematically illustrates a preferred embodiment 10 of laser apparatus in accordance with the present invention. Apparatus 10 includes a regenerative amplifier 11 having a primary resonator terminated by mirrors $M_1$ and $M_4$, and "folded" by mirrors $M_2$ and $M_3$ and a polarizing beamsplitter 20. Because the resonator is folded by the polarizing beamsplitter it is only a resonator for radiation incident on the beamsplitter polarized perpendicular to the plane of incidence of the beamsplitter as indicated by arrowhead $P_S$.

The primary resonator includes a birefringent gain-medium 12 that has different gain for two polarization-planes perpendicular to each other. One such gain-medium is neodymium-doped gadolinium orthovanadate Nd:GdVO$_4$. This is a tetragonal crystal material usually arranged with an a-axis aligned with the resonator axis, with the highest gain being for light plane-polarized parallel to the c-axis. In the continuing description it is assumed that gain-medium 12 is Nd:GdVO$_4$, but this should not be construed as limiting the present invention. In this arrangement, the axis of the primary resonator terminated by mirrors $M_1$ and $M_4$ is aligned with the path of the o-ray through the birefringent gain-medium, i.e., along the a-axis of the crystal Gain-medium 12, during an operational period of apparatus 10 is continually optically pumped by 808 nm radiation (pump-light) L from a diode-laser array (not shown) and delivered from the diode-laser array by an optical fiber 14. The gain-medium provides peak gain at about 1064 nm. The pump-light is focused into the gain-medium by lenses 15 and 16 through mirror $M_3$ which has high reflection at the peak gain wavelength and high transmission at the wavelength of the pump-light. When regenerative amplifier 11 is not amplifying a pulse, a quarter-wave plate 22 cooperative with a Pockels cell 24 and polarizing beamsplitter 20 prevents radiation from being generated in the primary resonator terminated by mirrors $M_1$ and $M_4$.

This is achieved by setting the Pockels cell to provide net zero polarization rotation such that plane-polarized radiation that has been reflected from polarizing beamsplitter 20 and made a double pass through the quarter-wave plate 22 and the Pockels cell is polarization-rotated 90° and is now polarized in a plane indicated by arrow $P_p$ that is transmitted by the polarizing beamsplitter out of the primary resonator. Accordingly radiation cannot circulate in the primary resonator. This can be described, for purposes of this description and the appended claims, as the primary resonator being in a "closed" mode. In the closed mode, the gain-medium would become saturated absent any preventive measure.

This is prevented in this embodiment of the inventive apparatus by providing a secondary resonator terminated by mirror $M_4$ and another mirror $M_5$ and folded by mirror $M_2$. This resonator does not include the switching arrangement provided by polarizing beamsplitter 20, quarter-wave plate 22 and the Pockels cell. The longitudinal axis of this secondary resonator is aligned with the path of the e-ray (extraordinary ray) through the birefringent gain-medium. This path is at an angle of about 0.7 degrees to the a-axis of the gain-medium. The a-axis is the path of the ordinary ray (o-ray) through the gain medium. The longitudinal axis of the primary resonator is aligned with the path of the o-ray though the gain-medium. The axes of the primary and secondary resonators are collinear between the gain-medium and mirror $M_4$. In the gain-medium and between the gain-medium and fold-mirror $M_2$ the axes of the primary and secondary resonators (designated by solid and dashed lines respectively) diverge. Preferably, the output face of the gain-medium (the face furthest from mirror M3) is non-orthogonally aligned with the a-axis to increase the angle between the resonator axes.

CW radiation is generated in the secondary resonator for the "wrong" polarization-plane, i.e., the polarization-plane for which the gain of gain-medium 12 is least. The power of radiation generated can be controlled by selectively adjusting a tilt angle that a transparent plate 42 such as a glass or fused silica plate makes with the secondary-resonator axis as indicted by arrows A. Adjusting the angle of the plate 42 adjusts the amount of light reflected out of the secondary resonator. The gain is preferably held at a level slightly higher, for example about 10% higher than the peak gain reached during delivery of a pulse train. The primary resonator is a resonator only for plane-polarized radiation having the "right" polarization-orientation in gain-medium 12, i.e., the polarization-orientation for which the gain of gain-medium 12 is greatest. An acousto-optic modulator could be used instead of plate 42 to provide active control of losses.

When it is desired to deliver a train of pulses from the regenerative amplifier, a train of seed-pulses is delivered from a mode-locked seed-pulse laser 28. Mode-locked lasers typically provide pulses having a duration of a few picoseconds or less at pulse-repetition frequencies (PRFs) of a few megahertz (MHz). The regenerative amplifier is operated at pulse-repetition frequencies of tens to hundreds of kilohertz (KHz), and therefore only selected ones of the pulses from the seed laser are amplified. The selection mechanism is well-known to those skilled in the art but is reviewed briefly below as it pertains to the present invention.

A pulse to be amplified is directed by mirrors 30 and 32 through a Faraday isolator 34, a lens 36 and another Faraday isolator 24 and delivered to polarizing beamsplitter 20 plane-polarized in a plane that is transmitted by the polarizing beamsplitter. The pulse enters the primary resonator while in the "closed" state. The polarization-plane of the pulse is then rotated by 90 degrees following a double pass through the quarter waveplate and the (inactive) Pockels cell as described above and therefore will be reflected by the polarizing beamsplitter 20 into the primary resonator and towards gain-medium 12. At about this point, the Pockels cell is switched to a state such to provide a 90 degree polarization rotation on the double pass, whereby a double pass through the quarter-wave plate and the Pockels cell provides no net polarization. Accordingly the pulse circulates in the primary resonator, being amplified as energy is extracted by the pulse from gain-medium 12. A half-wave plate 23 rotates the polarization of the pulse to that for which gain is strongest in gain medium 12 and re-rotates the polarization plane of the pulse returning from the gain-medium into the orientation that is reflected by polarizing beamsplitter 20. Essentially as soon as this circulation begins, gain in the gain-medium is reduced below the threshold required for CW lasing in the secondary resonator, and lasing in the secondary resonator ceases.

After a predetermined time, the Pockels cell is switched back to a state such that a double-pass through quarter-wave plate 22 and the Pockels cell produce a net 90 degree polarization rotation, and the amplified pulse is transmitted out of the primary resonator through splitter 20. Optionally, a sample of the pulse can be obtained from a beamsplitter 40. The main output pulse is directed out of apparatus 10 along the rejection channel of Faraday isolator 24 as depicted. This pulse trapping and transmitting is repeated until the train of amplified pulses is delivered. After the final pulse in a train is delivered the gain increases until CW lasing begins in the secondary resonator as described above, and clamps the gain in gain-medium 12 until it is desired to deliver another train of pulses.

Figure 2:
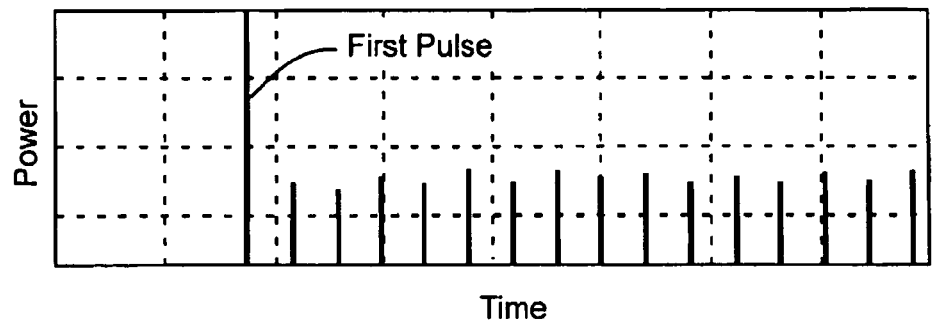
FIG. 2 schematically illustrates an oscilloscope trace of a 50 kilohertz pulse train generated by an example of prior-art regenerative amplifier apparatus similar to the apparatus of FIG. 1 but not having the secondary resonator for gain clamping.

FIG. 2 is a graph schematically illustrating an oscilloscope trace of a 50 KHz pulse-train generated by a prior-art regenerative amplifier apparatus being an example of the apparatus of FIG. 1 but not having a secondary resonator for providing gain clamping. In this example, the gain-medium was $Nd:GdVO_4$ pumped by 808 nm radiation from a diode-laser array. Seed-pulse laser 28 was a low-power mode-locked fiber laser delivering pulses having a duration of about 6 picoseconds at a PRF of about 40 MHz. The average peak power of the second and subsequent pulses in a pulse-train was about eighty percent less than the peak power of the first pulse in the pulse-train.

Figure 3:
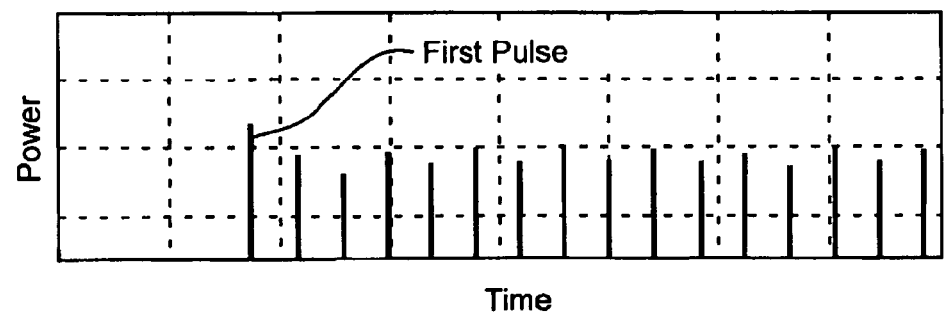
FIG. 3 schematically illustrates an oscilloscope trace of a 50 kilohertz pulse train generated by an example of the apparatus of FIG. 1.

FIG. 3 is a graph schematically illustrating an oscilloscope trace of a 50 KHz pulse-train generated by the example of the apparatus of FIG. 1 including the inventive secondary resonator formed between mirrors $M_4$ and $M_5$. It can be seen that, in this case, the first pulse in the pulse-train has only a slightly higher power than the average peak power of the second and subsequent pulses in the pulse-train.

It was found that when the regenerative amplifier was operated at higher PRF, the secondary resonator became increasingly less effective at first pulse suppression. This is believed to be because the peak gain between pulses was increasingly reduced. In a with-and-without-the-secondary resonator comparison made operating the above-discussed example of apparatus 10 at a PRF of 200 KHz, it was found that the first pulse in a pulse-train with the secondary-resonator gain-clamping operative had a peak power that was about 5 times the average peak power of the second and subsequent pulses in the pulse-train. Without the gain-clamping, however, the peak-power in the first pulse was about 20 times the average peak power of the second and subsequent pulses in the pulse-train. It is to be expected that this frequency of dependence of the effectiveness of the present invention may be different for different gain-media.

Those skilled in the art will recognize that while the present invention has been described in the context of a particular example of a regenerative amplifier, the invention is applicable to any regenerative amplifier including a gain-medium having a polarization dependent gain and being sufficiently birefringent to allow a secondary resonator to be added according to principles of the present invention. Examples of such gain media include but are not limited to any ion-doped yttrium orthovanadate ($X:YVO_4$), and ion-doped gadolinium orthovanadate ($X:GdVO_4$).

Figure 4:
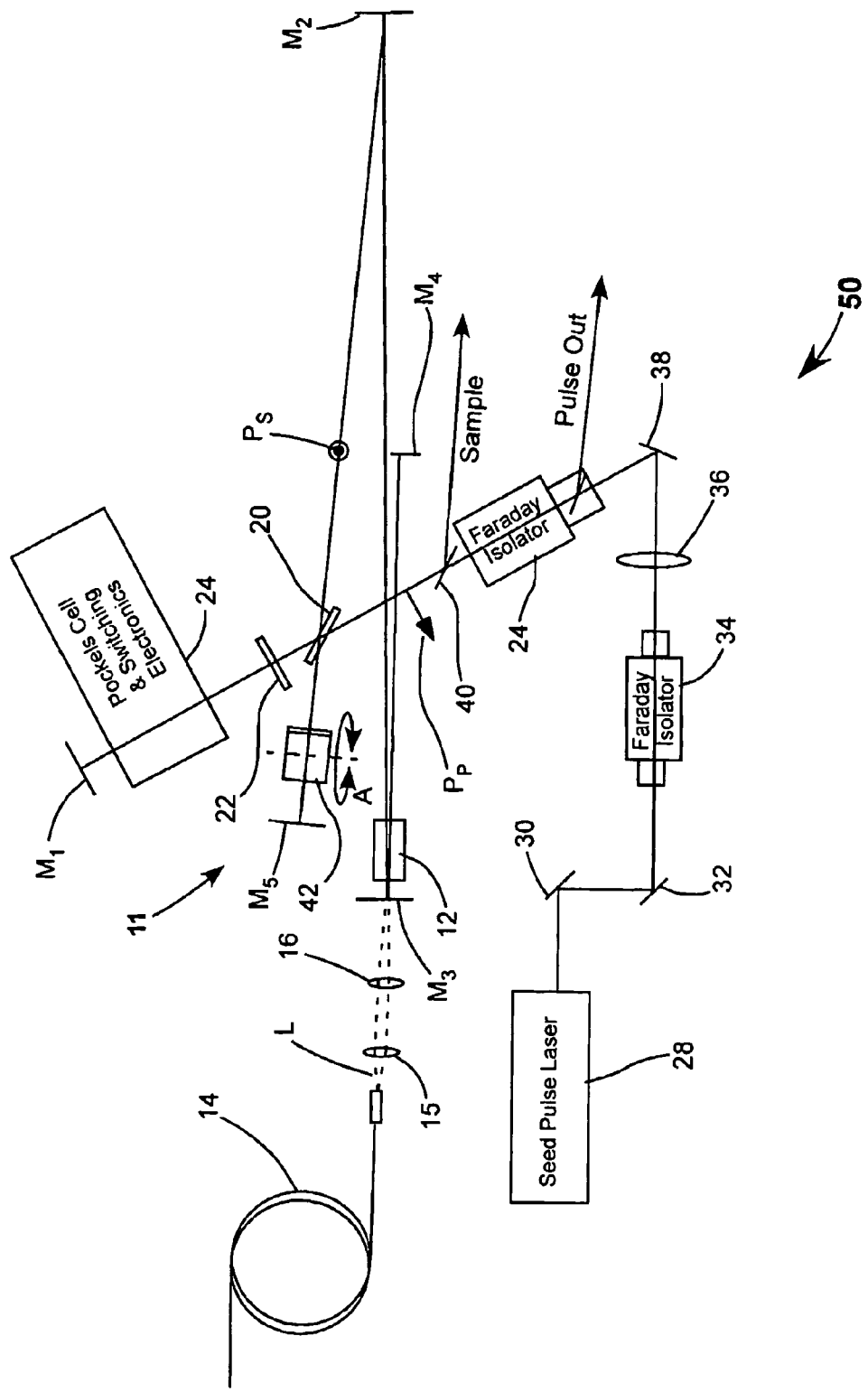
FIG. 4 schematically illustrates another embodiment of laser apparatus in accordance with the present invention, similar to the embodiment of FIG. 1 but wherein the secondary resonator is differently configured.

The invention is also applicable to gain-media that have minimal birefringence and minimal polarization dependence such Ti:sapphire and Nd:YAG. By way of example, FIG. 4 schematically illustrates an embodiment 50 of apparatus in accordance with the present invention that can be used with such a gain-medium. Apparatus 50 is similar to above apparatus 10 with an exception that the secondary resonator is differently configured. The secondary resonator is terminated by mirrors $M_4$ and $M_5$ as in apparatus 10. However in apparatus 50 the axes of the primary and secondary resonators are collinear between mirror $M_4$ and a polarizing beamsplitter 20. Polarizing beamsplitter 20 transmits radiation having a polarization-orientation perpendicular to that for which the primary resonator is configured and accordingly the resonator axes are at an angle to each other and the secondary resonator does not include the optical switching arrangement of the primary resonator. A rotatable plate 42 is included in the secondary resonator to provide that the secondary resonator can be made sufficiently lossy that CW lasing will cease when the secondary resonator becomes operational as described above.

Those skilled in the art will also recognize without further detailed description or illustration that principles of the present invention are applicable not only in a primary resonator that is operated as a regenerative amplifier but also in a primary resonator that is operated as a Q-switched laser to generate pulses. In the case of the embodiments of FIGS. 1 and 4 wherein a Pockels cell switching arrangement is deployed the primary resonator could be operated as a Q-switched laser. The primary resonator could also be operated as a Q-switched laser by replacing the Pockels-cell 24 and quarter-wave plate 22 by an acousto-optic modulator, and making mirror $M_1$ partially transparent to couple output out of the primary resonator. In these and other such variations, the secondary resonator could be operated as described above to limit gain in the gain-medium when pulses were not being generated in the primary resonator.

In summary, the present invention is described above in terms of a preferred and other embodiments. The invention is not limited, however, to the embodiments described and depicted. Rather, the invention is limited only by the claims appended hereto.

What is claimed is:

1. Optical apparatus for amplifying a pulse, comprising:
   an external seed pulse generator for generating seed pulses;
   a primary resonator terminated by first and second mirrors, said primary resonator including a gain-medium and an optical switching arrangement for opening and closing the primary resonator; and
   a secondary resonator terminated at one end by a third mirror, wherein the second mirror is not part of the secondary resonator and the third mirror is not part of the primary resonator, said secondary resonator including the gain-medium but not including the optical switching arrangement and wherein when said primary resonator is closed, radiation circulates in the secondary resonator in order to control the gain in the gain medium and wherein said primary resonator is opened in order to circulate and amplify a seed pulse of radiation from the external seed pulse generator.

2. The apparatus of claim 1, wherein the gain-medium is a birefringent medium and the secondary resonator is terminated by the first mirror and the third mirror.

3. The apparatus of claim 2, wherein the resonator axes of the primary and secondary resonators are collinear between the first mirror and the gain-medium and wherein the resonator-axes of the primary and secondary resonators are at an angle to each other in the gain-medium and between the gain-medium and the third mirror.

4. The apparatus of claim 3, wherein the gain-medium has a stronger gain for radiation plane-polarized in a first polarization-orientation than for radiation plane-polarized in a second-orientation perpendicular to the first orientation.

5. The apparatus of claim 4, wherein the primary resonator is configured for circulating through the gain-medium only radiation plane-polarized in the first polarization-orientation.

6. The apparatus of claim 5, wherein the secondary resonator is configured for circulating through the gain-medium only radiation plane-polarized in the second polarization-orientation.

7. The apparatus of claim 1, wherein the optical switch includes a Pockels cell cooperative with a quarter-wave plate and a polarizing beamsplitter and wherein the primary resonator is folded by the polarizing beamsplitter.

8. The apparatus of claim 7, wherein the apparatus is a regenerative amplifier, wherein said seed pulse to be amplified is injected into the primary resonator and an amplified seed pulse is directed out of the primary resonator by transmission through the polarizing beamsplitter.

9. The apparatus of claim 1, wherein the secondary resonator includes an optical arrangement for selectively varying optical loss therein.

10. The apparatus of claim 9, wherein the optical arrangement for selectively varying optical loss includes a transparent plate selectively tiltable with respect to the longitudinal axis of the secondary resonator.

11. The apparatus of claim 9, wherein the optical arrangement for selectively varying optical loss includes an acousto-optical modulator.

12. Optical apparatus, comprising:
a primary resonator terminated by first and second mirrors, said primary resonator including a birefringent gain-medium and an optical switching arrangement for opening and closing the primary resonator;
a secondary resonator terminated by the first mirror and a third mirror, wherein the second mirror is not part of the secondary resonator and the third mirror is not part of the primary resonator, said second resonator including the gain-medium but not including the optical switching arrangement; and
wherein longitudinal axes of the primary and secondary resonators are collinear between the gain medium and the first mirror and at an angle to each other in the gain-medium and between the gain medium and the second and third mirrors and wherein the losses in the secondary resonator are controlled to control the gain in the gain medium.

13. Optical apparatus, comprising:
a primary resonator terminated by first and second mirrors, said primary resonator including a gain-medium and an optical switching arrangement for opening and closing the primary resonator; and
a secondary resonator terminated at one end by a third mirror, wherein the second mirror is not part of the secondary resonator and the third mirror is not part of the primary resonator, said secondary resonator including the gain-medium but not including the optical switching arrangement and wherein when said primary resonator is closed, radiation circulates in the secondary resonator in order to control the gain in the gain medium and wherein said primary resonator is opened in order to circulate and amplify a pulse of radiation therein and wherein the gain-medium is a birefringent medium and the secondary resonator is terminated by the first mirror and the third mirror, wherein the resonator axes of the primary and secondary resonators are collinear between the first mirror and the gain-medium and wherein the resonator-axes of the primary and secondary resonators are at an angle to each other in the gain-medium and between the gain-medium and the third mirror wherein the gain-medium has a stronger gain for radiation plane-polarized in a first polarization-orientation than for radiation plane-polarized in a second-orientation perpendicular to the first orientation.

14. The apparatus of claim 13, wherein the primary resonator is configured for circulating through the gain-medium only radiation plane-polarized in the first polarization-orientation.

15. The apparatus of claim 14, wherein the secondary resonator is configured for circulating through the gain-medium only radiation plane-polarized in the second polarization-orientation.

16. The apparatus of claim 13, wherein the secondary resonator includes an optical arrangement for selectively varying optical loss therein.

17. The apparatus of claim 16, wherein the optical arrangement for selectively varying optical loss includes a transparent plate selectively tiltable with respect to the longitudinal axis of the secondary resonator.

18. The apparatus of claim 16, wherein the optical arrangement for selectively varying optical loss includes an acousto-optical modulator.

19. Optical apparatus, comprising:
a primary resonator terminated by first and second mirrors, said primary resonator including a gain-medium and an optical switching arrangement for opening and closing the primary resonator; and
a secondary resonator terminated at one end by a third mirror, wherein the second mirror is not part of the secondary resonator and the third mirror is not part of the primary resonator, said secondary resonator including the gain-medium but not including the optical switching arrangement and wherein when said primary resonator is closed, radiation circulates in the secondary resonator in order to control the gain in the gain medium and wherein said primary resonator is opened in order to circulate and amplify a pulse of radiation therein, and wherein the optical switch includes a Pockels cell cooperative with a quarter-wave plate and a polarizing beamsplitter and wherein the primary resonator is folded by the polarizing beamsplitter.

20. The apparatus of claim 19, wherein the apparatus is a regenerative amplifier, wherein a seed pulse to be amplified is injected into the primary resonator and an amplified seed pulse is directed out of the primary resonator by transmission through the polarizing beamsplitter.

21. The apparatus of claim 19, wherein the secondary resonator includes an optical arrangement for selectively varying optical loss therein.

22. The apparatus of claim 21, wherein the optical arrangement for selectively varying optical loss includes a transparent plate selectively tiltable with respect to the longitudinal axis of the secondary resonator.

23. The apparatus of claim 21 wherein the optical arrangement for selectively varying optical loss includes an acousto-optical modulator.

24. Optical apparatus, comprising:
a primary resonator terminated by first and second mirrors, said primary resonator including a birefringent gain-medium and an optical switching arrangement for opening and closing the primary resonator;
a secondary resonator terminated by the first mirror and a third mirror, wherein the second mirror is not part of the secondary resonator and the third mirror is not part of the primary resonator, said second resonator including the gain-medium but not including the optical switching arrangement; and
wherein longitudinal axes of the primary and secondary resonators are collinear between the gain medium and the first mirror and at an angle to each other in the gain-medium and between the gain medium and the second and third mirrors and wherein the losses in the secondary resonator are controlled to control the gain in the gain medium and wherein the longitudinal axis of the primary resonator is aligned with the path of an ordinary ray through the gain-medium and the longitudinal axis of the secondary resonator is aligned with the path of an extraordinary ray through the gain-medium.

25. The apparatus of claim 24, wherein the gain medium is Nd:GdVO$_4$.

26. The apparatus of claim 25, wherein the gain medium is Nd:YVO$_4$.

* * * * *